Inventors
HARRY A. SHELLEM
GEORGE T. CAMPBELL

Inventors
HARRY A. SHELLEM
GEORGE T. CAMPBELL

March 22, 1949.   H. A. SHELLEM ET AL   2,464,830
SLUG FEEDING AND INSPECTION MECHANISM FOR
JACKETED PROJECTILE ASSEMBLING MACHINES
Filed June 22, 1945                         9 Sheets-Sheet 3

Inventors
HARRY A. SHELLEM
GEORGE T. CAMPBELL

By J. H. Church & W. E. Thibodeau
Attorneys

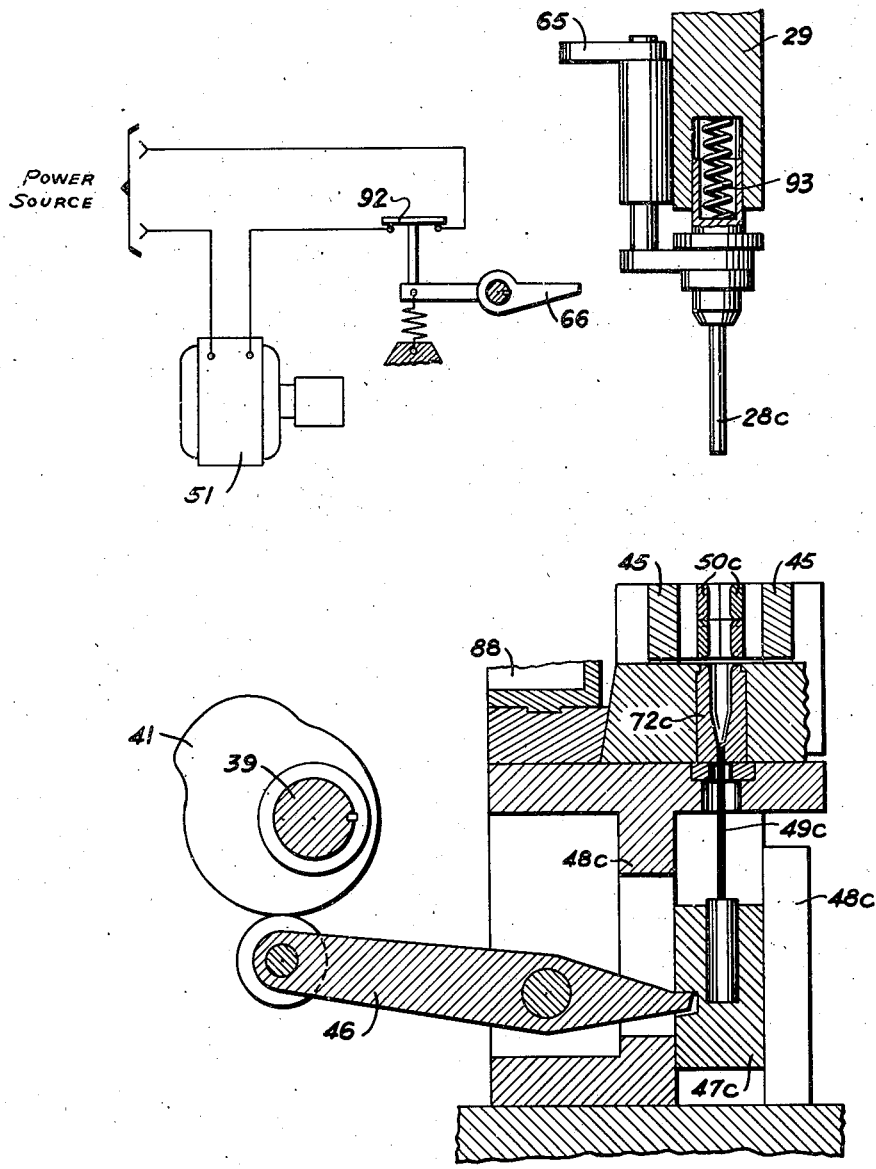

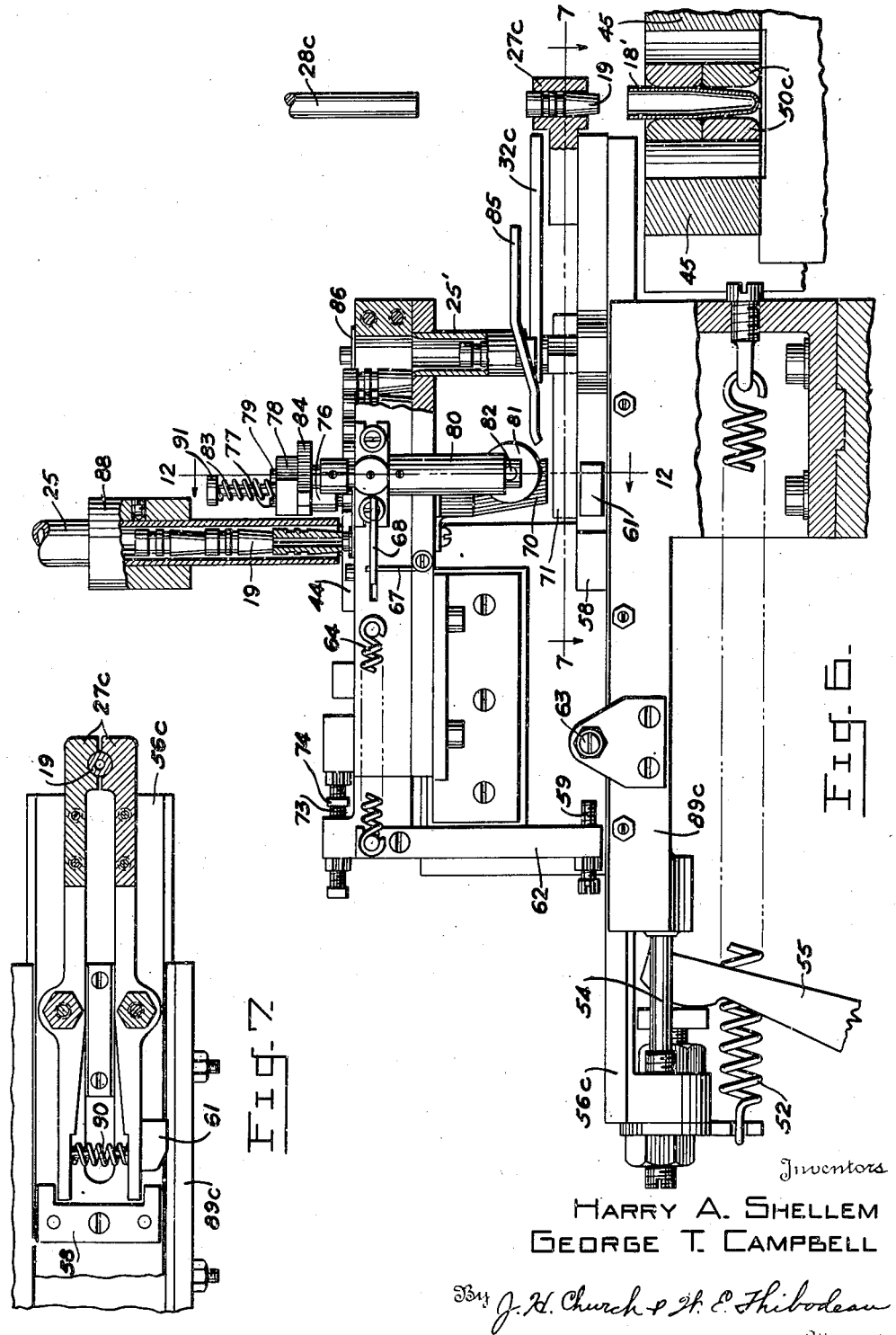

Inventors
HARRY A. SHELLEM
GEORGE T. CAMPBELL
By J. H. Church & W. E. Thibodeau
Attorneys

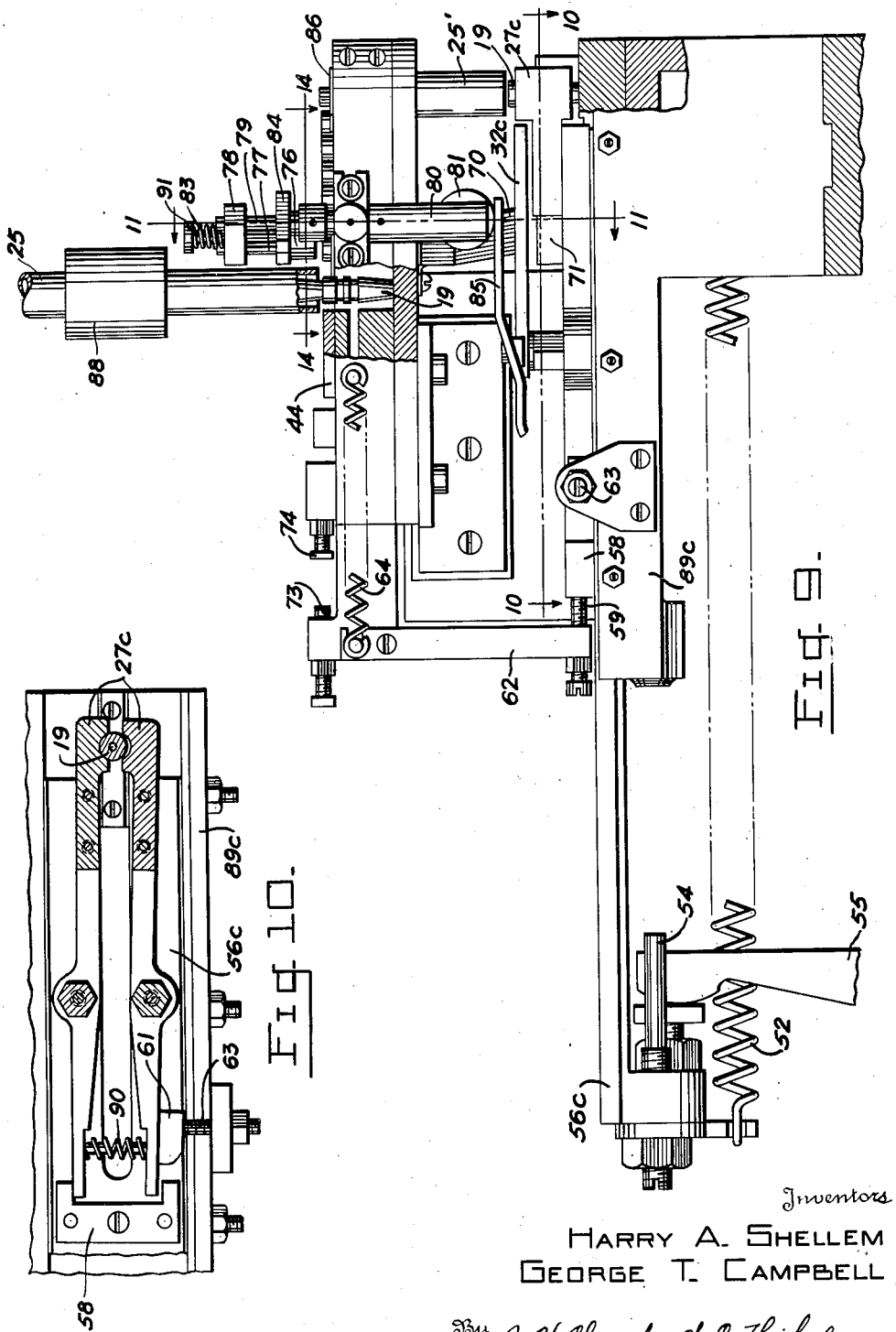

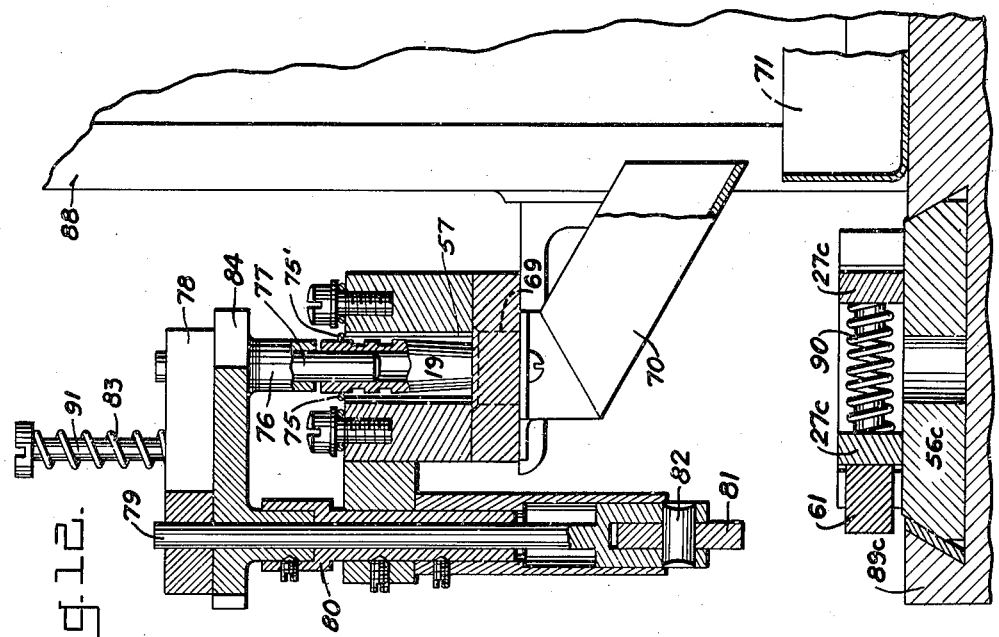
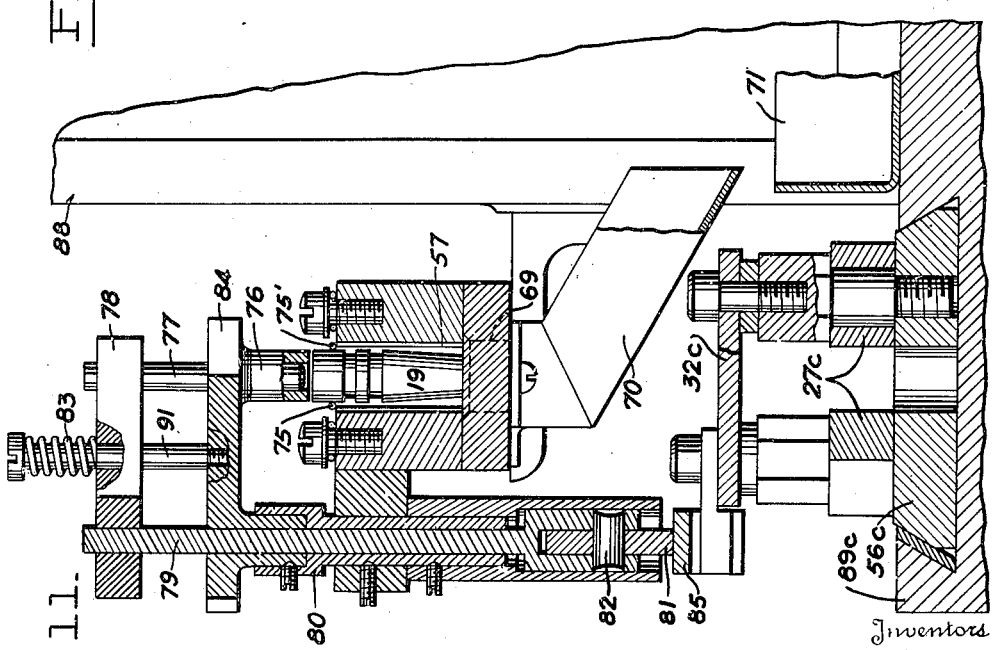

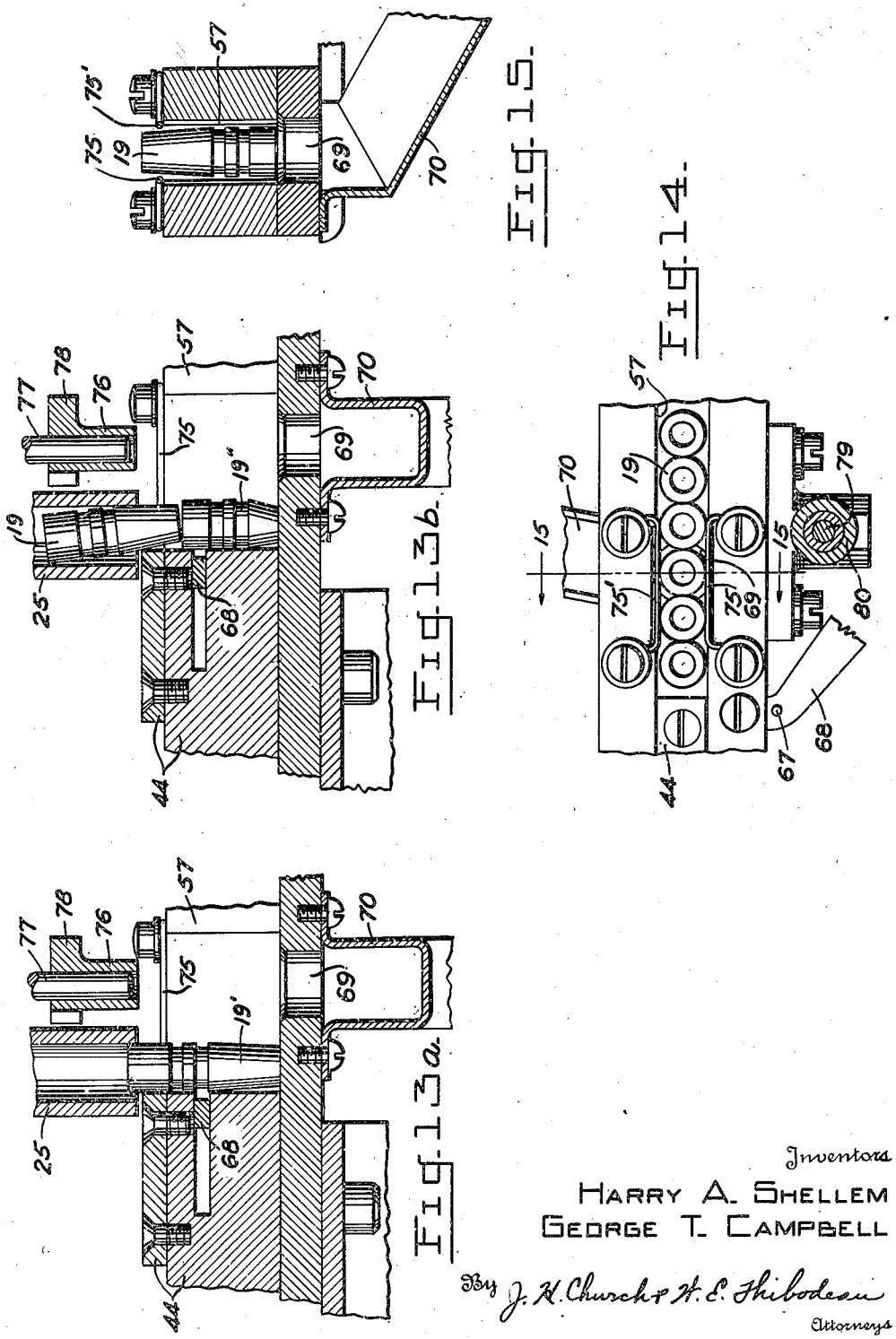

Patented Mar. 22, 1949

2,464,830

UNITED STATES PATENT OFFICE 2,464,830

SLUG FEEDING AND INSPECTION MECHANISM FOR JACKETED PROJECTILE ASSEMBLING MACHINES

Harry A. Shellem, Philadelphia, and George T. Campbell, Croydon, Pa.

Application June 22, 1945, Serial No. 601,052

4 Claims. (Cl. 209—75)

(Granted under the act of March 3, 1883, as amended April 30, 1928; 370 O. G. 757)

The invention described herein may be manufactured and used by or for the Government for governmental purposes without the payment to us of any royalty thereon.

Our invention relates to the manufacture of small arms ammunition and it has particular reference to machines for assembling the components of jacketed projectiles.

Generally stated, the object of our invention is to improve the mechanism by which core slugs are fed into such machines so as simultaneously to provide automatic inspection of the slugs for dimensional irregularities.

A more specific object is to provide automatic detection of core slugs which are invertedly positioned, or whose diametrical or longitudinal dimensions are under-sized or over-sized.

Another object is to replace manual gaging of core slugs by a mechanized inspection operation, thereby decreasing the required number of attendant personnel while increasing their efficiency.

In practicing our invention we attain the foregoing and other objects by providing a novelly combined feed and inspection mechanism by which core slugs may be gaged and then introduced into bullet assembly machines in a unique and superior manner. Illustrative embodiments of our invention are shown by the accompanying drawings wherein:

Fig. 5 shows the ejector punch operating mechanism at the slug supply station as viewed from line 5—5 of Fig. 1 and also the machine's automatic power cut off facilities at the same station;

Figure 1:
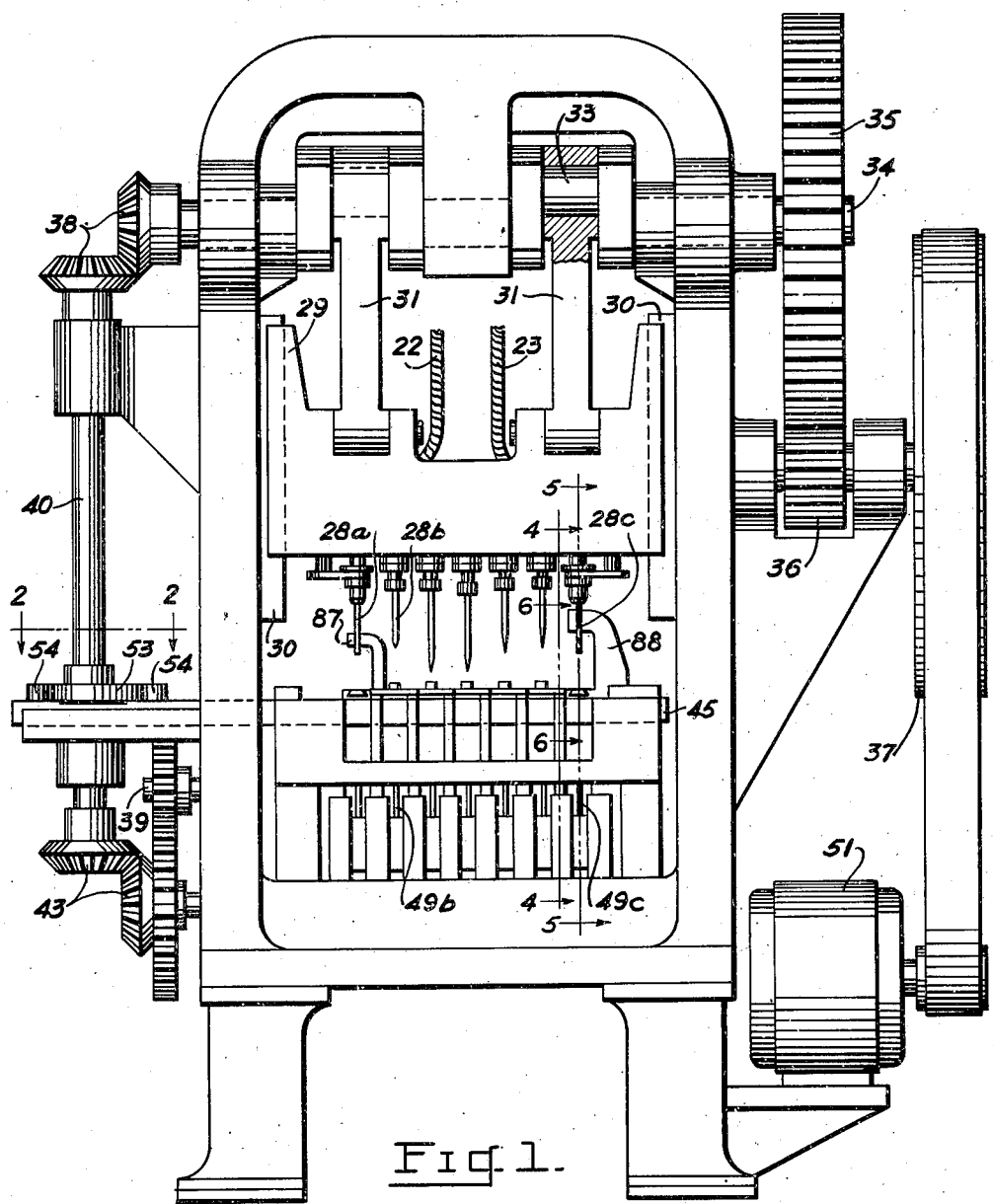
Fig. 1 is a frontal showing in simplified schematic form of one typical projectile assembling machine which may be benefited by the slug feed and inspection improvements of our invention.
Figure 6:
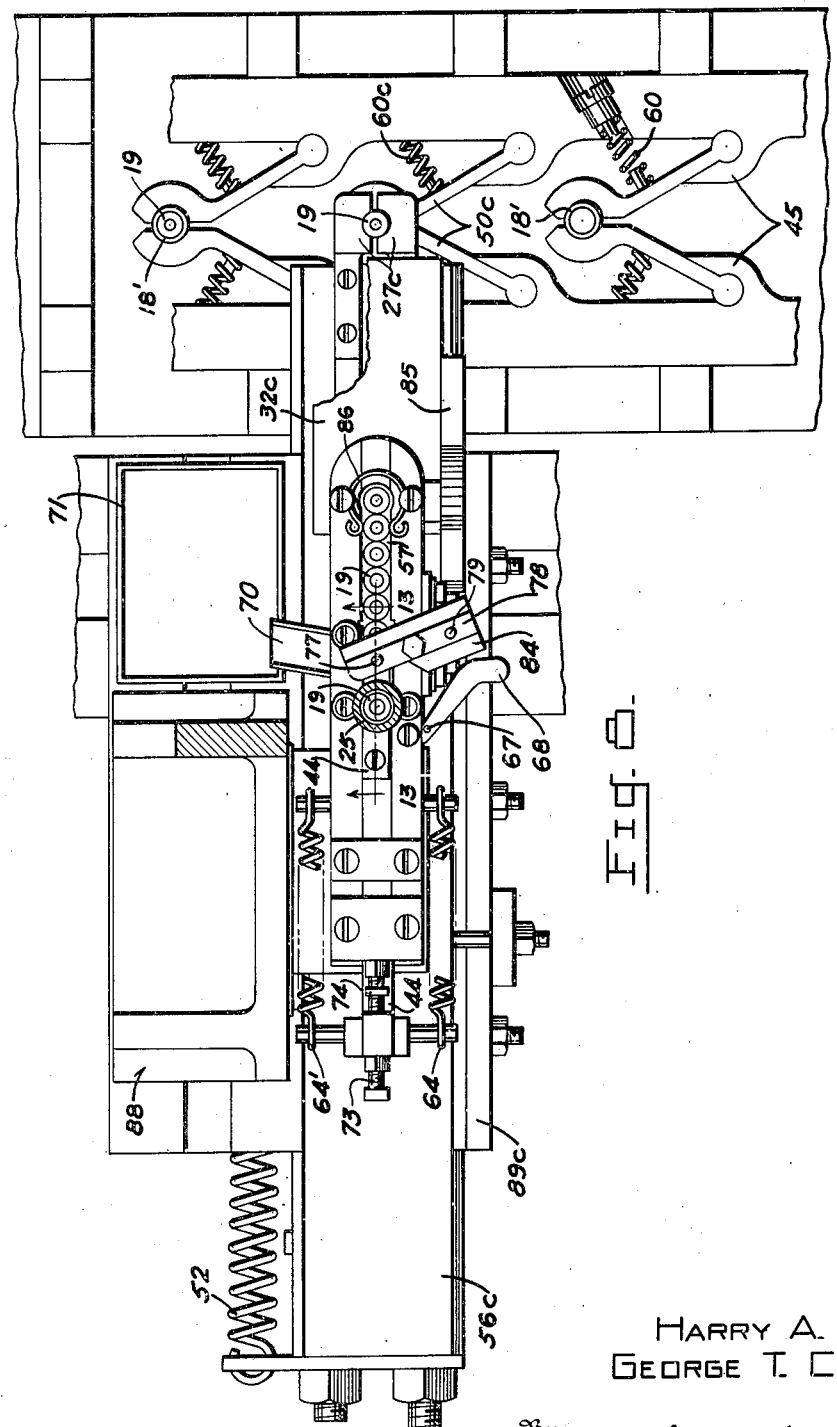

Fig. 6 presents a side view of our improved slug feed and inspection device (not represented by Fig. 1) as same appears from line 6—6 when attached to Fig. 1's bracket 88 and when in the act of supplying an inspected core slug to the appropriate work station;

Fig. 7 shows the slug station feed fingers as viewed from line 7—7 of Fig. 6 when same are clenching a core slug;

Fig. 8 represents further details of the Fig. 6 slug feed and inspection apparatus in partly cut away top plan view;

Fig. 9 shows how the reciprocating feed slide of the Fig. 6 mechanism is returned to receive an inspected core slug for delivery to the work station;

Fig. 10 shows the slug station feed fingers as viewed from line 10—10 of Fig. 9 and diverged preparatory to grasping a core slug;

Fig. 11 represents portions of our core slug's bore gaging mechanism as viewed from line 11—11 of Fig. 9;

Fig. 12 similarly shows this bore gaging device in operation as viewed from line 12—12 of Fig. 6;

Fig. 13a is a section from line 13—13 of Fig. 8 through our inspection mechanism channel showing an over-length core slug trapped therein;

Fig. 13b shows the same inspection channel with an underlength core slug entrapped therein;

Fig. 14 shows our paired spring wire gaging elements for core slug outside diameter inspection as viewed in top plan from line 14—14 of Fig. 9; and Fig. 15 is a section on line 15—15 through the inspection channel of Fig. 14 showing an inverted core slug therein and also indicating how underdiameter cores are rejected by the spaced wire gaging elements.

*Projectile assembling machines which may be benefited*

The improvements of our invention are here described as applied to a projectile assembling machine of the conventional construction schematically shown by Figs. 1 to 5. The function of such a machine is to assemble jacket blanks of the type shown at 18 by Figs. 3, 6, 8 and core slugs of the type shown at 19 by Figs. 3, 6, 8 to 15 into completed projectiles for small arms ammunition use. Machines capable of doing this are well known to the art and those elements thereof believed essential to a full understanding of our improvements have been represented in the drawings and will first be explained.

Figure 4:
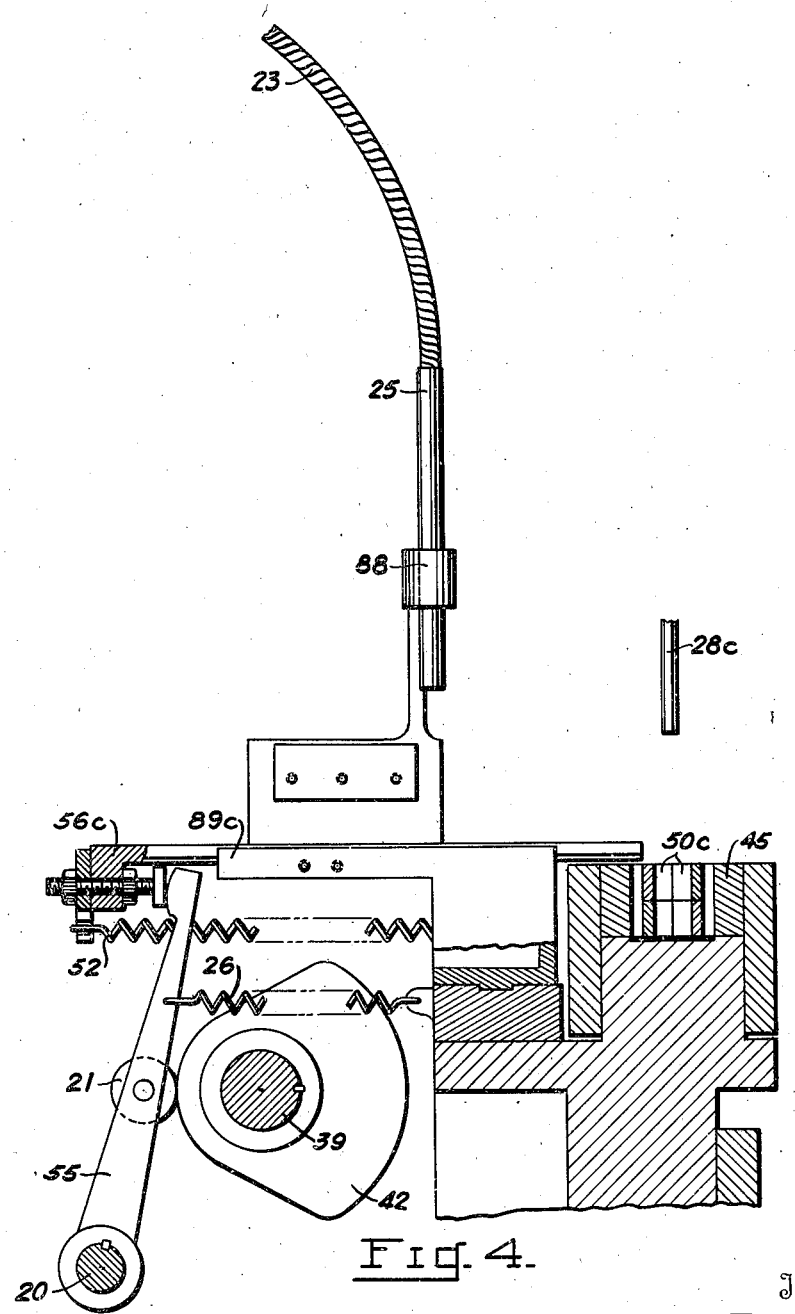
Fig. 4 shows the machine's slug delivery and feed tubes as viewed from line 4—4 of Fig. 1, the support bracket 88 for our new inspection device (but with the device removed from that bracket) and the slug station's feed carriage with operating cam.

In the simplified showing of Fig. 1, the jacket blanks 18 are fed by gravity from a "pin type" hopper (not shown) into the machine through delivery tube 22 of Fig. 1 and the slugs 19 likewise are fed by gravity from a similar hopper (not shown) through a second delivery tube 23 of Figs. 1 and 4. The slug supply hopper may also be of the "pin type" for hollow core slugs 19, or of the "ring type" construction for solid slugs. The blanks 18 so fed continuously fill tube 22, and each advances under its own weight closed end first downwardly therethrough. The slugs 19 so fed continuously fill tube 23 (Figs. 1 and 4), and each is advanced pointed end first downwardly through the tube by gravity.

Figure 3:
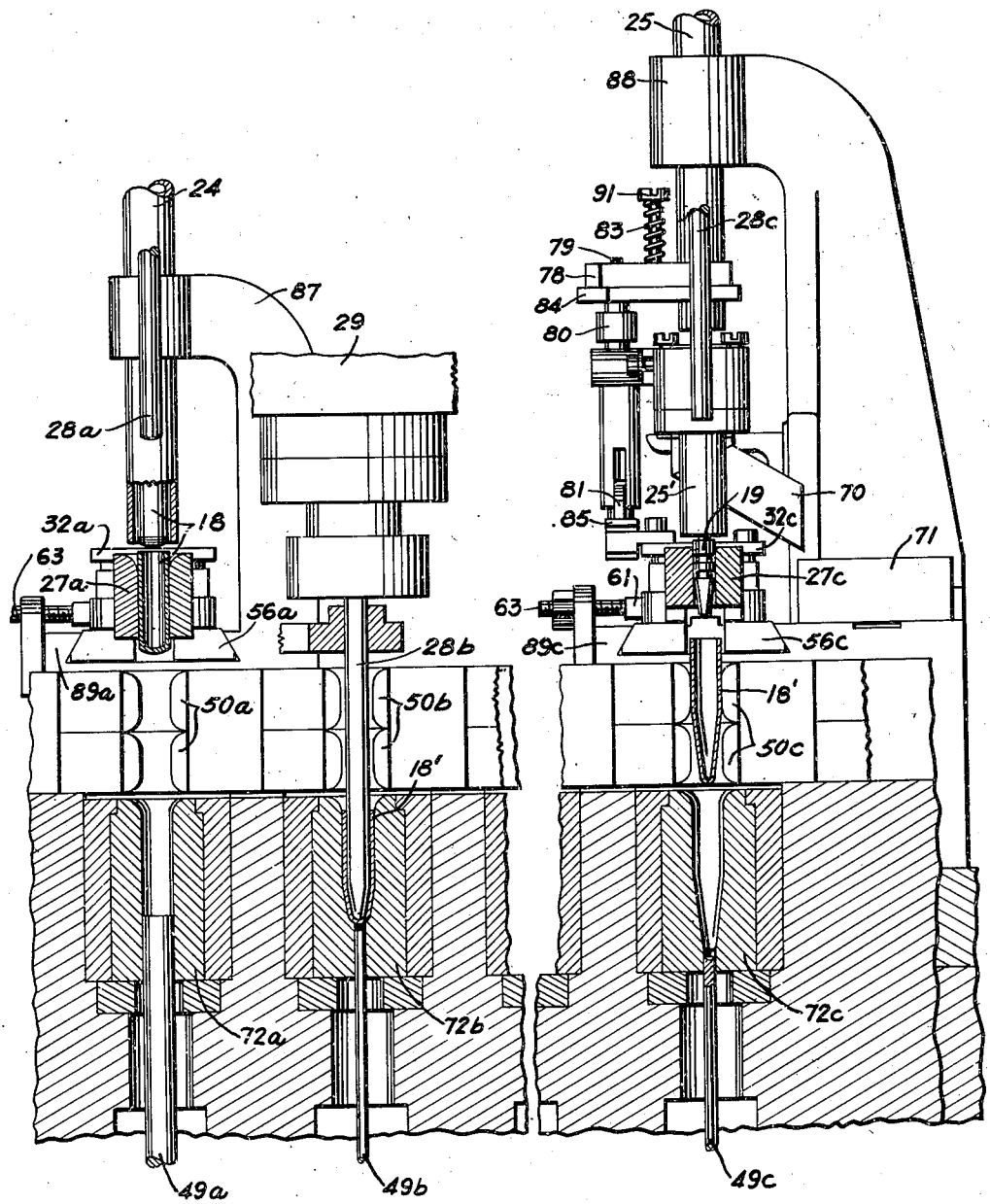
Fig. 3 shows our new slug feed and inspection facilities applied to the last of three representative work stations reproduced (partly in section and to enlarged scale) from the machine of Fig. 1.

From delivery tube 22, the jacket blanks 18 pass into a first feed tube shown at 24 in Fig. 3 which is positioned directly above and somewhat behind the machine's first work station; from delivery tube 23 the slugs 19 pass into a similarly arranged second feed tube 25 (shown by Figs. 3, 4, 6, 9, 13) which is positioned above and behind a subsequent work station of the machine.

Issuance of the jacket blanks 18 from feed tube 24 is restrained by a flat plate 32a (shown by Fig. 3) situated in near-abutting relationship to that tube's lower end. This flat plate 32a is part of a slidably reciprocating mechanism which includes a pair of feed fingers shown at 27a by Fig. 3. Upon each rearward movement of those parts feed fingers 27a receive a jacket blank 18 from tube 24; and upon each forward return motion of the parts, these fingers convey that blank to the Fig. 1 machine's first work station. In the machine here described, it will be assumed that about 56 blanks per minute are so conveyed.

Restriction of the core slugs 19 within upper feed tube 25 is effected by the flat upper surface of a ram-like member 44 (see Figs. 6, 8, 9, 13, 14), which is part of a slidably mounted reciprocating mechanism at the represented machine's final work station. It is at this station that the core slug inspection facilities of our invention are operative. At properly regulated intervals, the core slugs 19 are released by member 44 for feeding through a number of uniquely arranged automatic gaging devices later to be described.

All acceptable, properly dimensioned slugs finally pass through lower feed tube 25' which is offset from upper tube 25 as shown by Figs. 3, 6, 8, 9, and are therein restrained against issuance by a flat plate 32c which almost abuts that tube's lower ends. As in the case of the jacket blank feed mechanism, plate 32c moves rearwardly together with a pair of feed fingers 27c (see Figs. 3, 6, 8 and 9) which receive successive slugs 19 for forward conveyance to the machine's final work station, also at a rate of 56 per minute.

Ejection of each jacket blank 18 and of each slug 19 from the respective feed fingers 27a and 27c and into the machine's work station immediately therebeneath is then effected by the corresponding jacket punch 28a and slug punch 28c. These two punches, in cooperation with one or more intermediate jacket pointing punches (only one is here shown at 28b), move downwardly at proper intervals to effect the desired jacket shaping and slug inserting operations. This movement actually is simultaneous on the part of all punches (as will be evident from Fig. 1); in Fig. 3, however, pointing punch 28b is for explanatory reasons shown down, while jacket and slug punches 28a and 28c are up.

Serving to impart the named downward movement to punches 28a—28b—28c is a reciprocator 29 to which the punches are mechanically fixed, as indicated in Fig. 1. This reciprocator is slidably mounted for upward and downward movement between stationary guides 30. That movement, in turn, is communicated to the reciprocator by two connecting rods 31 journaled at their upper ends to the crank pins 33 of the machine's main crankshaft 34.

Serving to impart rotation to crankshaft 34 is a main gear shown in Fig. 1 at 35 as being driven by a pinion 36 meshed therewith. That pinion, in turn, is rotated by a pulley 37 belt-connected with an electric motor 51 or other suitable source of power. Thus driven at some suitable speed, such as about 56 R. P. M., crankshaft 34 repeatedly moves punch reciprocator 29 through its upward and downward range of travel about 56 times each minute.

The complete machine further includes a camshaft 39 which rotates at the same speed as and in exact synchronism with the main crankshaft 34 just described. In the arrangement shown, such synchronous rotation is imparted to the camshaft from main drive pinion 36 and through a connection which includes a first pair of bevel gears 38, a shaft 40 leading therefrom, and a second pair of bevel gears 43.

Operated by cam 53 on shaft 40 (see Figs. 1 and 2) is the machine's transfer slide 45; operated by cam 42 on camshaft 39 (see Fig. 4) is a reciprocating feed carriage 56 at each jacket and slug supply station; and operated by cam 41 on camshaft 39 (see Fig. 5) is a reciprocator 47 by which the machine's several ejector punches 49 are carried.

Figure 2:
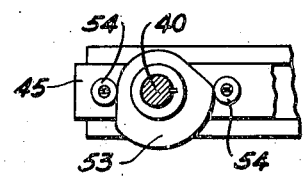
Fig. 2 is a view from line 2—2 of Fig. 1 of the cam and rollers which actuate the machine's transfer mechanism.

Transfer slide 45 extends lengthwise of the machine and beneath the several feed punches 28. Its purpose is to advance the jacket blanks 18 and the core slugs 19 through the machine in the direction of from left to right as viewed in Figs. 1 and 3. The back and forth sliding motion necessary to effect this purpose is imparted from a cam 53 carried by camshaft 40 and roller 54 connected to slide 45 as shown in Figs. 1 to 2. By means of this linkage, slide 45 is moved through its back and forth travel once during each rotation of crankshaft 34, cam shaft 39 and shaft 40. At the machine's illustrative operating speed of 56 R. P. M., this results in 56 movement cycles per minute.

The ejector reciprocator 47 earlier mentioned is slidably mounted in the machine for upward and downward movement (see Figs. 3 and 5) between stationary guides 48. Such movement is imparted thereto by the ejector cam 41 on shaft 39 through a linkage illustratively shown in Fig. 5 as including a rocker lever 46. The cycle of such movement repeats itself for each rotation of camshaft 39 and crankshaft 34, and this takes place in synchronism with the feed punch and transfer slide movements earlier described.

Once during each shaft rotation cam 41 thus pushes reciprocator 47 upwardly and causes the ejecting punch 49 carried thereby to push the jacket 18 or slug 19 out of the appropriate forming die 72 and into the transfer mechanism's feed fingers 50 (see Figs. 3, 4, 5 and 8). These fingers, in turn, serve to advance the jacket or slug to the next work station.

At each of the jacket and slug supply stations (see Fig. 3) use is made of a rocker arm 55 (shown in Fig. 4) which operates mechanism appropriate for delivering jackets and slugs one by one to the corresponding work station in proper timing with other parts of the machine. These rocker arms are pivotably supported by a shaft 20, and are pushed rearwardly once during each rotation of the camshaft 39 by a lobe on the feed cam 42 which rotates with the shaft and contacts roller 21 as illustrated by Fig. 4. Following this rearward movement a spring 26 draws rocker arm 55 forward, helping to maintain this arm in constant contact with cam 42. The described rearward movement imparted to rocker arm 55 by cam 42 takes place in proper synchronism with the feed punch, transfer slide and ejector punch movements.

Each time that rocker arm 55 is so acted on it pushes the slidably mounted feed carriage 56 (Figs. 4, 6, 8, 9) rearward a certain distance determined by the size of cam 42; forward return of this feed carriage following this action is effected by one or more springs 52. The return of carriage 56 to its exact former position is further regulated by a set screw 54 which moves forward with the carriage from its Fig. 9 location to strike the table 89 on which feed carriage 56 slides as shown in Fig. 6. Such back and forth sliding movement of the carriage causes like reciprocation of the attached plate 32 and fingers 27 which thus effect the transfer of a slug (or slug jacket) from feed tube 25 (or 24) to the corresponding work station, as Figs. 4, 6, 8 and 9 illustratively show.

The appropriate feed punch 28 then moves downward to execute further passage of the slug or jacket from the feed fingers 27 to the proper die 72 in the machine's work station therebeneath, as more fully described by later sections of this specification.

In this manner, each forward thrust and return cycle of carriage 56 enables a single slug 19 (or jacket 18) to be supplied to the machine's work stations from the continuous line being fed through delivery tube 23 (or 22) from the corresponding supply hopper.

*The jacket supply station of illustrative machine*

Introduction of the jacket blanks 18 into the illustrative machine now being described is effected at the station shown generally by Fig. 1, and in greater detail by the left portion of Fig. 3. This station is made up of two distinct sections both supported on a bracket 87 (Figs. 1, 3). One, which we may call the gravity feed section, is composed of a pin type hopper (not shown); the jacket delivery tube 22 leading downwardly from that hopper; and the feed tube 24 leading downwardly from delivery tube 22. The other, which we may term the jacket receiving section is comprised of the flat plate 32a (Fig. 3) and feed fingers 27a, both securely attached to the sliding feed carriage 56a (Fig. 3).

Operation of the jacket supply station's mechanism is as follows. The jacket blanks 18 await their turn in the feed tube 24 wherein they are prevented from issuance by the flat plate 32a. The back and forth sliding movement of the feed carriage 56a makes possible commuting of feed fingers 27a between feed tube 24, where the fingers receive a jacket blank, and the machine's work station, where the blank is to be delivered for punch 28a's action thereupon.

As feed fingers 27a are being drawn back to receive a blank 18, a protuberance 61 jutting from the side of one of the fingers makes contact with a "pressure screw" 63 (see Figs. 3–4 and also Figs. 6 to 10 which show the identical mechanism used for slug feeding). This contact causes a compression of that feed finger inwardly against spring 90, and simultaneous divergence of the finger's semi-circular jaw. When the so separated fingers are brought back to a position immediately beneath feed tube 24, a single blank 18 is received by them.

As the fingers are again moved forward, protuberance 61 and "pressure screw" 63 break contact, and spring 90 expands, thereby causing the fingers' jaws to firmly clamp about the jacket blank just received by them. This front-wise movement of the feed fingers is participated in by the attached flat plate 32a which comes forward to intercept and prevent the next jacket blank 18 from dropping out of the feed tube 24.

When the jacket blank is brought to the machine's work station, downward movement of feed punch 28a forces the blank 18 into the fingers 50a of the transfer mechanism therebeneath (see Fig. 3). Upon upward return movement of the feed punch these fingers retain the jacket blank therebetween for transfer to the next work station.

*Illustrative machine's transfer mechanism*

Carriage of the jacket blanks 18 and the slugs 19 to successive work stations of the illustrative machine now being described is effected by transfer mechanism shown as consisting of a transfer slide 45 made up of a number of feed fingers 50 (see Figs. 1, 3 to 6 and 8). These fingers clamp the work securely upright, but separate against springs 60 (see Fig. 8) when struck by feed punches 28 and ejector punches 49 to accept or eject the work as required.

This transfer slide 45 reciprocates in a horizontal plane under the earlier described action of cam 53 (see Figs. 1–2). This moves each set of feed fingers 50 back and forth between adjacent work stations. Such movement effects proper transfer of the work, then returns the fingers to receive the piece to be moved in continuous succession.

By means of the levers, gears and cams already described by reference to Figs. 1–2, the transfer mechanism is coordinated and timed to pass one jacket or slug about every second from one work station to the next. This timing is such that the downwardly moving punch 28 strikes the work just after it has been brought into the corresponding work station. As the feed punch withdraws, the ejecting punch 49 advances upwardly as shown in Figs. 3 and 5 to remove the work in time to permit the transfer mechanism's succeeding set of feed fingers 59 to receive that work for transfer to the succeeding station.

*Improved core slug supply and inspection station*

Our inventive improvements are applied to the station at which the core slugs 19 are introduced into the machine. Same is shown at the right of each of Figs. 1 and 3 and also by Figs. 4, 5, 6, 8 to 15. This slug supply station is composed of two sections which are almost duplicative of the jacket supply station's members. Thus, there is a similar gravity feed section which includes a hopper (not shown), delivery tube 23 leading downwardly from the hopper (see Figs. 1 and 4), and a bi-sectioned feed tube 25—25' (see Figs. 3, 6, 9); and also a similar slug receiving section which includes a flat plate 32c (see Figs. 3, 6, 8, 9, 11) and feed fingers 27c, both securely attached to the sliding feed carriage 56c (see Figs. 3, 6, 8, 9, 11).

Operation of the slug supply station's mechanism has in part been described in the earlier given outline of how the entire machine is constructed. The core slugs 19 await their turn in the upper feed tube 25 before being permitted to drop into the feed fingers 27c for delivery to the appropriate work station.

In the improved form which we have evolved, this supply station has been modified to automatically gage and inspect core slugs 19 during the course of the machine's slug feeding operation. Thus, our illustratively shown improvement will gage and detect slugs whose internal or external diameters, or longitudinal measurements are under or over sized, without reducing the machine's output capacity in any way.

Following this inspection operation, the slugs 19 reach the lower or second part 25' (see Figs. 3, 6, 9) of the bi-sectioned feed tube wherein they are prevented from issuance by the flat plate 32c. The back and forth sliding movement of the feed carriage 56c makes possible commuting of feed fingers 27a between feed tube 25', where the fingers receive a slug 19, and the machine's work station where the slug is to be delivered for punch 28c's action thereupon.

As feed fingers 27c are being drawn back to receive a slug 19, a protuberance 61 jutting from the side of one of the fingers makes contact with a "pressure screw" 63 (see Figs. 6, 7, 9 and 10). This contact causes a compression of that feed finger inwardly against spring 90, and simultaneous divergence of the finger's semi-circular jaw. When the so separated fingers are brought back to a position immediately beneath feed tube 25', a single slug 19 is received by them.

As the fingers are again moved forward, protuberance 61 and "pressure screw" 63 break contact, and spring 90 expands thereby causing the fingers' jaws to firmly clamp about the slug just received by them. This front-wise movement is participated in by the attached flat plate 32c which comes forward to intercept and prevent the next core slug 19 from dropping out of the feed tube 25'.

When the core slug is brought to the machine's work station, downward movement of feed punch 28c forces the slug 19 into the pointed jacket blank 18' held between the fingers 50c of the transfer mechanism therebeneath (see Fig. 3). Further movement of the punch pushes the jacket and slug downwardly into the assembly die 72c where the two components are properly fitted together.

Upon upward return movement of the feed punch 28c, ejector punch 49c (see Fig. 5) forces the thus assembled projectile 18'—19 (see Fig. 8) upwardly between the transfer mechanism's fingers 50c. Thus positioned, the projectile is passed by the transfer mechanism to succeeding stations and finally down a slide out of the machine and into a receiving hopper (not shown).

*Our new mechanism for core slug inspection*

In the illustrative form here shown, our improved slug inspection mechanism is made up of a number of parts uniquely organized into an automatic gaging device and all supported by a bracket 88 (see Figs. 1, 3, 4, 6, 9, 11–12). This inspection apparatus is an important improvement to bullet assembly machines. It eliminates a number of time-consuming manual gaging operations, thereby enabling the attainment of maximum machine and attendant personnel efficiency. Details thereof are shown by Figs. 3, 4, 6, 8, 9 and 11 to 15.

Each slug 19, released as aforesaid, drops with its tapered end first just out of the end of upper feed tube 25 by gravity, and into the rearmost portion of the inspection guide track or channel 57 (see Figs. 8, 11 to 15). One slug after another is made to "run the gamut" of various dimensional gaging devices, the successful passage of which brings them to lower feed tube 25', and ultimate delivery to the machine's work station, as was previously described.

The core slug 19 awaiting droppage into channel 57 is restrained against exit from feed tube 25 by the upper surface of sliding ram 44 (see Fig. 6), until the machine's operative cycle has brought back feed fingers 27c to receive a slug from feed tube 25'. At that same instant, the ram 44 is caused to slide back and away from its position whereby it blocks feed tube 25's exit as shown in Fig. 9. The number of slugs in channel 57 being depleted by one slug having dropped through feed tube 25' and into the feed fingers 27c, the core slug next in turn simultaneously drops out of feed tube 25 and into the inspection channel 57 as shown in Fig. 9.

Reference to Figs. 6 to 10 will make clear how this simultaneous exchange of uninspected for inspected core slugs in channel 57 is effected. Rearward movement of the feed carriage 56, which brings feed fingers 27c back to receive a slug from feed tube 25', causes the carriage-attached striker bar 58 to strike a set screw 59 as shown in Fig. 9. This set screw protrudes from a perpendicular arm 62 whose uppermost end is connected with the rearmost portion of the sliding ram 44.

The amount of protrusion of set screw 59 is then regulated so that the perpendicular arm to which it is initially attached, and the ram 44 to which it is indirectly connected, will be extended rearwardly a certain prescribed distance under the pressure of striker bar 58 upon the set screw. This measured distance is such that when the feed fingers 27c are directly beneath feed tube 25', the ram 44 is temporarily withdrawn from its blocking position under feed tube 25 just long enough to permit a slug to drop into the channel 57 while, as previously described, another slug drops from feed tube 25' into feed fingers 27c (see Fig. 9).

The sliding ram 44 is then brought back to its previous position (as shown in Fig. 6) to block the exit from tube 25 by tension of springs 64 and 64', thereby nudging the row of core slugs in the channel further forward. This occurs as soon as the set screw and ram-extending pressure is removed by the forward movement of the feed carriage which carries with it the striker bar 58 (see Fig. 6).

The ram 44 is capable of being regulated so that it does not move too far forward on its return stroke, as this would push the cores past the gaging devices without allowing the slugs an opportunity to be gaged. Moreover, the ram's forward stroke must be just long enough to fulfill its slug blocking action beneath feed tube 25, yet not so long as to disrupt the careful timing which permits simultaneous channel 57 entry and departure of a single slug, as previously described. This regulation of the ram is effected by adjusting the length of one or two set screws, 73—74, as illustratively shown in Figs. 6, 8 and 9.

*Gaging the slug's length*

Upon emergence of the core slug 19 from feed tube 25 the first dimension to be gaged is the slug's overall length. As Fig. 9 clearly shows, the distance between the lower end of feed tube 25 and the upper surface of a slug whose length is within acceptable tolerances in the channel 57 therebelow is very small, as for example 1/64 inch. When an overly long slug such as 19' drops into the channel, if its length exceeds the 1/64 inch clearance, its upper end remains trapped in the feed tube, and the ram 44 cannot urge the slug forward in the channel 57 (see Fig. 13a).

This blocking of the line of slugs awaiting issuance from the feed tube 25 will eventually cause an absence of a core slug in the feed fingers 27c. Feed punch 28c is attached to reciprocator 29 by a spring construction shown at 93 in Fig. 5 so that as the punch moves downward between these fingers, failure to meet the normal resistance offered it by the presence of a core slug between the fingers will cause the punch to travel downwards farther than it otherwise would. This permits an automatic switch-off bar 65 which is attached to the feed punch in the manner shown in Fig. 5 to also move downwards a greater distance than usual. In so doing bar 65 strikes a lever 66 which acting through switch 92 breaks the power supply circuit (shown in simplified form by Fig. 5) for electric motor 51 and thereby stops the machine.

The operator frees the machine of the extra long slug by one or two tugs on lever 68 (see Figs. 6, 8, 13a, 13b and 14) situated beneath upper feed tube 25 which serves to force the slug forward in the channel 57. This lever 68 is prevented from accidentally moving the slugs by action of the straight steel spring 67. Optionally, the operator can then extract the slug by lifting it out of the channel, or by slight downward pressure force the slug through a reject hole 69 (see Figs. 11, 12, 13, 15) in channel 57's floor, down a short chute 70 and into a box 71 for receiving rejected core slugs.

The machine will also automatically "detect" core slugs 19" which are under the required length. As reference to Fig. 9 will show, the upper surface of a slug of acceptable length standing in channel 57 and the upper surface of ram 44 both have practically identical clearances of approximately 1/64 inch with the exit end of feed tube 25.

The upper surface of the slug which is in the channel 57 immediately beneath feed tube 25 supports the slug next in line above. It will be evident from the drawings and description that as the first slug is removed by the forward moving ram, its support to the slug next above will be replaced by the ram's upper surface (see Fig. 6).

When a slug which drops into channel 57 from feed tube 25 happens to be under required length such as shown by 19", the supported slug next above will extend below the feed tube a distance greater than the permissible maximum clearance, typified by 1/64 inch (see Fig. 13b). The forward moving ram 44 will therefore strike not only the "short" slug 19", but also the one next above which partially protrudes downward from the feed tube, thus blocking further progression of the slugs in the channel.

Here again, as in the case of extra long slugs 19', this blocking of the line of slugs in channel 57 will eventually cause the absence of a core slug in feed fingers 27c, and the machine will automatically be shut off by the Fig. 5 power circuit breaker mechanism, in the same manner as previously described. The undersized slug 19" is likewise removed by the operator through means of lever 68, which shoves the slug over the hole 69 in the channel floor, down the chute 70 and into the reject box 71.

*Gaging the slug's external diameter*

Once a core slug 19 is found to be of acceptable length, it moves forward in channel 57 in the aforementioned manner, and is required to pass through two parallel piano wires (satisfactorily of SAE 1095 steel), bolted in a fixed position as indicated at 75 and 75' in Figs. 14 and 15.

These piano wires are separated by a distance equal to the core slug's required minimum external diameter at the region of the slug's largest, or untapered width. If the slug's external diameter is less than this minimum, the slug will not be supported by the piano wires and hence will drop through the hole 69 in the channel floor, down chute 70 and into the reject box 71. The manner in which such slugs are rejected is clearly illustrated by the inverted slug 19 in Fig. 15.

The piano wires 75 and 75' have a selected tension and "springing capacity." These wires will relax sufficiently to expand the measured distance between them, and let slugs having the maximum permissible external diameter pass through under the urging of the limited force imparted to the slugs by the ram 44. The amount of this limited force is carefully controlled by the selection of coiled springs 64—64' (see Figs. 6, 8-9) having the correct amount of required tension. This ram force must be sufficient to urge slugs having acceptable diameters past the gaging wires 75—75', but not so great that slugs whose diameters exceed maximum tolerances will also be forced therepast.

Slugs having oversized external diameters are detected and removed from the machine in a manner similar to the method described for inspection of extra long or short slugs. Failure of the overly wide slug to pass wires 75—75' will eventually cause an absence of a slug in feed fingers 27c. As previously described this will in turn cause switch-off bar 65 to depress the lever 66 which acts through switch 92 to break the power supply circuit (shown in simplified form by Fig. 5) for electric motor 51 and thereby stop the machine. The operator can then eject the slug by manipulating lever 68.

*Gaging the slug's bore*

Our improved inspection mechanism is further capable of automatically gaging for conformance with minimum dimensional requirements the internal diameter and length of slugs which have a longitudinal bore.

When the core slug 19 has successfully passed the external length and diameter gage tests, it is moved forward in channel 57 to a position directly beneath a cylindrical housing 76 which is situated directly over the hole 69 in channel 57's floor. The housing contains a male plug or plunger 77 (see Figs. 6, 8, 9, 11 to 13) whose diameter and length exactly equal the prescribed minimum dimensions for the slug's bore. Downward movement of plunger 77 into the bore of the slug therebeneath will therefore not affect slugs which have the proper internal dimensions. However, any slug having a bore whose diameter or length is under desired size will be forced downward, away from the supporting piano wires 75—75', through the hole 69 and into the reject box 71.

Reference to Figs. 6, 9, 11 and 12 clearly shows how this bore-gaging operation is synchronized with other functions of the machine. Plunger 77 is attached to a cross bar 78 which rides up and down a stud 91, and to which is also attached a piston-like member 79 that works up and down in a housing contained cylinder 80. The lower end of piston 79 has a wheel 81 which is free to rotate about a tiny axle 82.

When the feed carriage 56c is in its foremost position as shown in Figs. 6 and 8, cross-bar 78 together with its attached plunger 77 and piston 79 are forced down by a stud 91 encircled compression spring 83 as far as they can go, which is the upper surface of cross-bar 84. In this position, the plunger 77 acts to gage the slug therebeneath it in the manner previously described (see Figs. 11–12), while the feed punch 28c is simultaneously ejecting a slug 19 from feed fingers 27c.

The return stroke of carriage 56c brings back the flat plate 32c and feed fingers 27c for the aforementioned purpose and manner of receiving a slug from feed tube 25'. At the same time an inclined slide or cam 85, which is attached to flat plate 32c, is moved from its position shown by Fig. 6 back to a point where wheel 81 rests on slide 85's highest level (see Fig. 9). This upward pressure on wheel 81 raises the piston 79 to which it is attached, thereby lifting up cross-bar 78 and plunger 77 to the positions shown in Figs. 9 and 11.

In this elevated position, plunger 77 no longer bars forward movement of the slugs in channel 57, and same is accomplished by the ram 44 as earlier described. The slugs are thus moved along the channel to finally drop down into feed tube 25'. A spring 86 made of steel (e. g., a plain carbon steel having 0.90–1.00 percent carbon) supports the slugs' bodies upright (see Figs. 6, 8 and 9) to insure their entering the lower feed tube 25' with the tapered ends first downward.

Operation of the complete machine

The manner in which the complete machine operates will have become more or less evident from the foregoing description of the machine's component parts. As already pointed out, the coordination among the several cam and gear arrangements is such that the cycle of each operating mechanism has the proper timing with respect to all cooperating mechanisms and parts.

The illustrative machine's operating speed of about 56 R. P. M. is transmitted alike to: (a) the main drive shaft 34 which works the feed punches 28; (b) the camshaft 39 together with cam 41 thereon which works the ejecting punches 49 and cam 42 thereon which operates the sliding feed carriage 56; and (c) the shaft 40 and cam 53 thereon which operates the transfer slide 45. This permits punches 28 and 49 to alternately enter the machine's work stations at a rate of almost once each second, and there to act upon the jackets 18 and slugs 19 which are released from feed tubes 24 and 25' at the named rate. This means that the machine is capable of assembling approximately 56 complete projectiles per minute.

At the first work station, shown at the extreme left of Figs. 1 and 3, jacket blanks 18 are brought into the machine through the mechanism previously described. Each blank so entering the machine's first work station is pushed into feed fingers 50a of the transfer mechanism therebeneath by downward movement of feed punch 28a.

Moving with transfer slide 45, these fingers 50a now carry the blank 18 to the right through the machine's successive work stations. There the jacket blank is drawn and pointed into the desired shape by various operations representatively illustrated by pointing punch 28b and a pointing die 72b shown in Fig. 3. As punch 28b is withdrawn upwardly, transfer fingers 50a return to the left in Fig. 3 to the machine's first work station. At the same time ejector punch 49b moves upwardly carrying the pointed jacket 18' into the transfer fingers 50b.

Moving with transfer slide 45, these fingers 50b next carry the pointed blank to the right and finally to the machine's slug supply work station shown at 50c in Figs. 3 and 8. Here the next downward movement of slug feed punch 28c pushes a slug 19, previously borne to the work station by feed fingers 27c, down into the pointed jacket 18' held in transfer fingers 50c therebeneath. Continued downward movement of punch 28c forces the slug and jacket into assembly die 72c (see Figs. 3 and 5) where these two parts are fitted together.

As slug punch 28c is withdrawn upwardly transfer fingers 50b return to the left in Fig. 3 to the machine's jacket pointing work station there shown. At the same time ejector punch 49c moves upwardly carrying the assembled projectile 18'—19 into the transfer fingers 50c (see Fig. 8). Succeeding cycles of operation carry this projectile still further to the right in Fig. 3 where further operations involving trimming, canneluring, etc. (not shown) are performed thereon.

Each core slug 19 entering the machine through the improved feed-inspection device of our invention is by it accurately checked for all required dimensional tolerances, then positioned for proper feeding into the pointed jacket blank 18' therebeneath. Thus, accurate assembly of the projectile is at all times assured.

Summary

Our here shown improvements in slug feed mechanisms for bullet assembling machines thus provide simultaneous automatic inspection for dimensional irregularities; they also provide automatic means of detecting core slugs which are invertedly positioned in the feed mechanism; and they further lower production costs by decreasing the required number of attendant personnel while increasing their efficiency.

Previously, the core slugs were fed to the machine by a mechanism which was similar to the jacket feed device previously described. Prior to such feeding of the slugs by that mechanism they were individually gaged by a number of manual operations. Our improved apparatus eliminates all these manual gaging steps and combines the inspection processes with the normal feeding operation. The machine is thereby enabled to automatically gage over 25,000 core slugs in an 8-hour day, without any additional personnel assistance required by the machine operator. Formerly, at least four of five highly skilled inspectors were required to gage that many slugs in the same period.

The straight line or other conventional types of bullet assembly machines can make use of the improved design here disclosed, regardless of caliber size, as substantially the only changes necessary are in selection of machine part sizes suited to the caliber and other dimensions of the projectiles to be assembled. Our improvement can readily be used for gaging dimensions of solid cores as well as for core slugs having the internal bore illustratively here described.

Our inventive improvements are therefore ex-

We claim:

1. In a machine for assembling jacketed projectiles, the combination of a work station, an inspection channel leading thereto, means for delivering tubular core slugs one by one to the remote end of said channel, means for advancing said delivered slugs successively through said channel towards said station, means including a single pair of spaced resilient wire members cooperating with said channel for gaging all slugs so advanced therethrough and for automatically ejecting from the machine those slugs which have an undersized outside diameter or length or which are invertedly positioned, other means for gaging and automatically ejecting from the machine those slugs which have an undersized inside diameter or internal bore length, and additional means for introducing gage-accepted core slugs into said machine's work station.

2. In a machine for assembling jacketed projectiles, the combination of a work station, an inspection channel leading therefrom, means for supplying core slugs having substantially straight and unflanged sidewalls one by one to the remote end of said channel, ram means for advancing said supplied slugs successively through said channel towards said station for delivery thereto, means including a single pair of spaced resilient wire members substantially paralleling the sides of said channel and having a selected tension and springing capacity which enables said members to expand sufficiently to allow slugs having a maximum permissible diameter to pass therethrough and offer the slugs lateral support while urging them through said channel under a force imparted by said ram which is ample therefor but sufficiently limited so that slugs whose external diameters exceed maximum tolerances are blocked in said channel instead of being forced therethrough, means for automatically stopping said machine's operation whenever said blocking of slugs occurs, and lever means thereafter operable to effect manual ejection from the machine of each over-diameter core slug so detected.

3. In a machine for assembling jacketed projectiles, the combination of a work station, an inspection channel leading therefrom and having an opening in the bottom thereof, means for supplying core slugs one by one to the remote end of said channel, means for advancing said supplied slugs successively through said channel towards said station for delivery thereto, and means including a single pair of spaced resilient wire members substantially paralleling the sides of said channel for simultaneously gaging the minimum permissible diameter of each of said advancing slugs and for permitting a droppage through said channel opening and out of the machine of each under-diameter slug so detected.

4. In a machine for assembling jacketed projectiles, the combination of a work station, an inspection channel leading therefrom and having an opening in the bottom thereof, means for supplying tubular core slugs one by one to the remote end of said channel, means for advancing said supplied slugs successively through said channel towards said station for delivery thereto, a pair of spaced resilient members substantially paralleling the sides of said channel and contacting the sides of each tubular core slug advanced therethrough in a way to prevent droppage of the slug through said channel opening, a cylindrical plunger gage of diameter equal to the minimum bore dimension acceptable for said tubular core slugs, and means for inserting said plunger gage downwardly into each slug when same is positioned over said channel opening whereby to permit retention in the channel of all slugs whose internal bore is larger than the diameter of said plunger gage but to eject therefrom downwardly through said opening each slug whose internal bore is smaller than the diameter of said gage or whose said bore extends into the slug a lesser distance than that desired.

HARRY A. SHELLEM.
GEORGE T. CAMPBELL.

REFERENCES CITED

The following references are of record in the file of this patent:

UNITED STATES PATENTS

| Number | Name | Date |
|---|---|---|
| 1,286,467 | Wilcox | Dec. 3, 1918 |
| 1,367,191 | Leckie | Feb. 1, 1921 |
| 2,015,573 | Strickland | Sept. 24, 1935 |
| 2,091,815 | Hommel | Aug. 31, 1937 |
| 2,156,822 | Smith | May 2, 1939 |
| 2,383,297 | Dorothea | Aug. 21, 1945 |